(12) United States Patent
Vanimisetti et al.

(10) Patent No.: US 8,481,170 B2
(45) Date of Patent: Jul. 9, 2013

(54) COMPOSITE MANUFACTURE

(75) Inventors: Sampath K. Vanimisetti, Karnataka (IN); David R. Sigler, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 231 days.

(21) Appl. No.: 13/039,349

(22) Filed: Mar. 3, 2011

(65) Prior Publication Data

US 2012/0225313 A1 Sep. 6, 2012

(51) Int. Cl.
*B32B 15/18* (2006.01)
*B23K 11/11* (2006.01)

(52) U.S. Cl.
USPC .......................................... 428/594; 428/683

(58) Field of Classification Search
None
See application file for complete search history.

(56) References Cited

U.S. PATENT DOCUMENTS

| | | | |
|---|---|---|---|
| 3,475,587 A | 10/1969 | Budds et al. | |
| 3,688,080 A | 8/1972 | Cartwright et al. | |
| 4,163,869 A | 8/1979 | Almand, III et al. | |
| 8,263,234 B2 * | 9/2012 | Okitsu | 428/683 |
| 2009/0255908 A1 * | 10/2009 | Sigler et al. | 219/91.2 |
| 2009/0302009 A1 * | 12/2009 | Sigler et al. | 219/117.1 |
| 2012/0129006 A1 * | 5/2012 | Kanai et al. | 428/683 |
| 2012/0141829 A1 * | 6/2012 | Oikawa et al. | 428/683 |
| 2012/0234799 A1 * | 9/2012 | Vanimisetti et al. | 219/117.1 |

FOREIGN PATENT DOCUMENTS

| | | | |
|---|---|---|---|
| EP | 2224029 A1 | * | 9/2010 |
| JP | 10-8195 | * | 1/1998 |
| JP | 2001-9573 | * | 1/2001 |
| JP | 2005-103608 | * | 4/2005 |
| JP | 2009-001839 | * | 1/2009 |
| JP | 2009-125801 | * | 6/2011 |
| WO | WO 2011/013793 | * | 2/2011 |

* cited by examiner

Primary Examiner — John J Zimmerman
(74) Attorney, Agent, or Firm — Quinn Law Group, PLLC

(57) ABSTRACT

A composite manufacture includes a first steel substrate, a second steel substrate disposed in contact with the first steel substrate to define a faying interface therebetween, and a spot weld joint penetrating the first steel substrate and the second steel substrate at the faying interface to thereby join the second steel substrate to the first steel substrate. The first steel substrate has a heat-affected zone adjacent the spot weld joint having a boundary, wherein the boundary and the faying interface define an angle therebetween of greater than about 75°.

15 Claims, 2 Drawing Sheets

COMPOSITE MANUFACTURE

TECHNICAL FIELD

The present disclosure generally relates to a composite manufacture, and more specifically, to a composite manufacture including steel substrates joined by a spot weld joint.

BACKGROUND

Resistance spot welding may be used to join steel substrates. In general, resistance spot welding may include clamping a workpiece, e.g., the steel substrates to be joined, between two electrodes with a force, and passing an electrical current from one electrode, through the workpiece, to the second electrode for a time period to thereby complete an electrical circuit. The electrical current generates heat from electrical resistance within the workpiece at both electrode-to-workpiece and substrate-to-substrate faying interfaces. The heat momentarily melts the steel substrates at the substrate-to-substrate faying interface to form a weld nugget, i.e., a spot weld joint, and thereby joins the steel substrates.

Spot weld joints formed via such welding may fatigue when subjected to many cycles of tensile shear load. However, spot weld joints which are substantially free from cracks, especially cracks that originate from the substrate-to-substrate faying interface, generally exhibit excellent weld strength and fatigue life.

SUMMARY

A composite manufacture includes a first steel substrate, a second steel substrate disposed in contact with the first steel substrate to define a faying interface therebetween, and a spot weld joint penetrating the first steel substrate and the second steel substrate at the faying interface to thereby join the second steel substrate to the first steel substrate. The first steel substrate has a heat-affected zone adjacent the spot weld joint having a boundary, wherein the boundary and the faying interface define an angle therebetween of greater than about 75°.

In one variation, the second steel substrate has a second heat-affected zone adjacent the spot weld joint having a second boundary, wherein the second boundary and the faying interface define a second angle therebetween of greater than about 75°.

In another variation, each of the first steel substrate and the second steel substrate is formed from advanced high strength steel. Further, the boundary extends from the faying interface, and the angle between the boundary and the faying interface is from about 80° to about 120°. In addition, the second boundary extends from the faying interface, and the second angle is from about 80° to about 120° so that the heat-affected zone and the second heat-affected zone combine to form a substantially hourglass shape.

The composite manufactures exhibit excellent high cycle fatigue life. That is, the composite manufactures are optimized to withstand a high number of cycles of tensile shear load applied to each of the first steel substrate and the second steel substrate. More specifically, the angle between the heat-affected zone and the faying interface slows crack propagation within the spot weld joint and therefore extends an operating life of the composite manufactures. That is, the angle and resulting shape of the heat-affected zone aligns the boundary with a direction of minimized energy release and stress intensity within the spot weld joint to minimize crack growth rates and maximize the fatigue life of the spot weld joint. Therefore, the angle deflects and propagates any cracks that originate at the faying interface along the boundary of the heat-affected zone, and thereby minimizes crack growth rates of the composite manufactures. As such, the composite manufactures are suitable for applications requiring excellent tensile strength, fatigue strength, and fatigue life without an accompanying increased thickness of the steel substrates.

The above features and advantages and other features and advantages of the present disclosure are readily apparent from the following detailed description of the best modes for carrying out the disclosure when taken in connection with the accompanying drawings.

DETAILED DESCRIPTION

Figure 1:
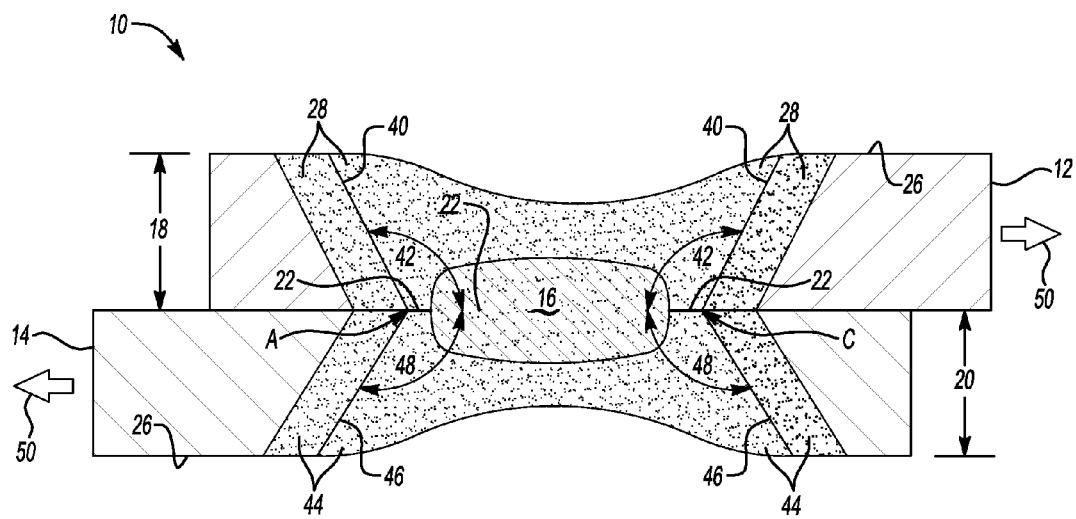
FIG. 1 is a schematic cross-sectional view of a composite manufacture including a second steel substrate joined to a first steel substrate by a spot weld joint.

Referring to the Figures, wherein like reference numerals refer to like elements, a composite manufacture is shown generally at 10 in FIG. 1. As set forth in more detail below, the composite manufacture 10 may be useful for applications requiring a first steel substrate 12 joined to a second steel substrate 14 by a spot weld joint 16 having maximized fatigue life. For example, the composite manufacture 10 may be useful for automotive applications requiring welded components. However, the composite manufacture 10 may also be useful for non-automotive applications, such as, but not limited to, aviation, rail, and construction applications.

As shown in FIG. 1, the composite manufacture 10 includes the first steel substrate 12. The first steel substrate 12 may be formed from any suitable steel for a desired application of the composite manufacture 10. For example, the first steel substrate 12 may be formed from steels such as, but not limited to, low carbon steels; high-strength low-alloy (HSLA) steels including ferrite and carbon and/or nitrogen precipitates of titanium, vanadium, and/or niobium; advanced high strength steels (AHSS); and combinations thereof. In particular, the first steel substrate 12 may be formed from suitable advanced high strength steels including, but not limited to, dual phase (DP) steels including ferrite and martensite; transformation induced plasticity (TRIP) steels including ferrite and martensite and/or bainite; complex phase (CP) steels including ferrite, martensite, bainite, and carbon and/or nitrogen precipitates of niobium, titanium, and/or vanadium; martensitic steels; and combinations thereof.

Referring again to FIG. 1, the first steel substrate 12 may have a first thickness 18 selected according to the desired application of the composite manufacture 10. For example, the first thickness 18 may be from about 0.5 mm to about 6 mm. For automotive applications in particular, the first thickness 18 of the first steel substrate 12 may be from about 1 mm to about 3 mm.

As further shown in FIG. 1, the composite manufacture 10 also includes the second steel substrate 14. The second steel substrate 14 may also be formed from any suitable steel according to the desired application of the composite manufacture 10. For example, for applications including strength and durability, the second steel substrate 14 may also be formed from steels such as, but not limited to, low carbon steels; high-strength low-alloy (HSLA) steels including ferrite and carbon and/or nitrogen precipitates of titanium, vanadium, and/or niobium; advanced high strength steels (AHSS); and combinations thereof. In particular, the second steel substrate 14 may be formed from suitable advanced high strength steels including, but not limited to, dual phase (DP) steels including ferrite and martensite; transformation induced plasticity (TRIP) steels including ferrite and martensite and/or bainite; complex phase (CP) steels including ferrite, martensite, bainite, and carbon and/or nitrogen precipitates of niobium, titanium, and/or vanadium; martensitic steels; and combinations thereof.

Therefore, at least one of the first steel substrate 12 and the second steel substrate 14 of the composite manufacture 10 may be formed from advanced high strength steel. However, the first steel substrate 12 and the second steel substrate 14 may be formed from the same or different steel.

Referring again to FIG. 1, the second steel substrate 14 may have a second thickness 20 that is different from the first thickness 18 of the first steel substrate 12. For example, the second thickness 20 may be greater than the first thickness 18. Alternatively, the first thickness 18 and the second thickness 20 may be approximately the same. For example, the second thickness 20 may also be from about 0.5 mm to about 6 mm. For automotive applications in particular, the second thickness 20 may be from about 1 mm to about 3 mm.

Figure 2:
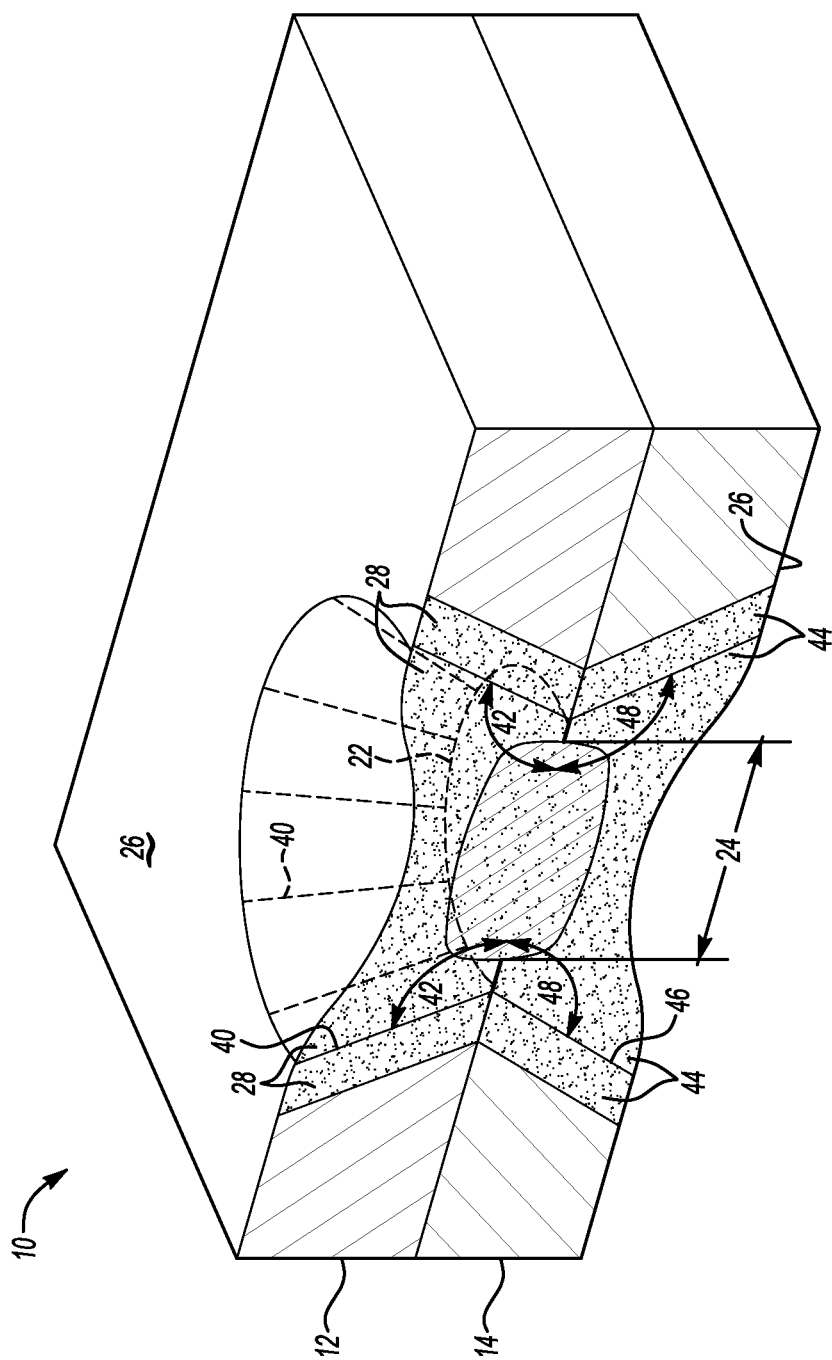
FIG. 2 is a schematic perspective cross-sectional view of another variation of the composite manufacture of FIG. 1.

As shown in FIGS. 1 and 2, the second steel substrate 14 is disposed in contact with the first steel substrate 12 to define a faying interface 22 therebetween. For example, the first steel substrate 12 may be aligned (FIG. 2) or offset (FIG. 1) with the second steel substrate 14 so as to contact the second steel substrate 14 at the faying interface 22. The first steel substrate 12 and the second steel substrate 14 may face and contact each other at the faying interface 22 in a lap-shear configuration, i.e., in an overlapping configuration as shown in FIG. 1.

Referring again to FIG. 1, the composite manufacture 10 further includes the spot weld joint 16 penetrating the first steel substrate 12 and the second steel substrate 14 at the faying interface 22 to thereby join the second steel substrate 14 to the first steel substrate 12. The spot weld joint 16 may be formed, for example, by a welding operation such as resistance spot welding. By way of general explanation, the welding operation may include contacting the first steel substrate 12 and the second steel substrate 14 between a first electrode (not shown) and a second electrode (not shown) so as to dispose the first steel substrate 12 and the second steel substrate 14 in electrically-conductive relationship with each of the first electrode and the second electrode. The welding operation may then include applying an electrical current through the first electrode to melt the faying interface 22 and form the spot weld joint 16 between each of the first steel substrate 12 and the second steel substrate 14 to thereby form the composite manufacture 10. As best shown in FIG. 2, the resulting spot weld joint 16 may have a generally circular shape when viewed from above, and an oval or "racetrack" shape when viewed in cross-section. In another example, although not shown, the resulting spot weld joint 16 may have an hourglass shape when viewed in cross-section. A diameter 24 of the spot weld joint 16 at the faying interface 22 may be approximately equal to four times the square root of the thickness 18, 20 of the thinner of the two steel substrates 12, 14. For example, as set forth above, the second thickness 20 may be greater than the first thickness 18, whereby the diameter 24 of the spot weld joint 16 at the faying interface 22 may be approximately equal to four times the square root of the first thickness 18 of the first steel substrate 12. Likewise, for applications where the first thickness 18 is greater than the second thickness 20, the diameter 24 of the spot weld joint 16 at the faying interface 22 may be approximately equal to four times the square root of the second thickness 20 of the second steel substrate 14. For automotive applications in particular, the diameter 24 of the spot weld joint 16 may be from about 4 mm to about 8 mm.

As shown in FIGS. 1 and 2, each of the first steel substrate 12 and the second steel substrate 14 may also have a second surface 26 spaced opposite and apart from the faying interface 22 that is not penetrated by the spot weld joint 16. That is, the spot weld joint 16 may be disposed within each of the first steel substrate 12 and the second steel substrate 14 at the faying interface 22, but may not penetrate the outer second surface 26 of each of the first steel substrate 12 and the second steel substrate 14. For example, penetration of the spot weld joint 16 within each of the first steel substrate 12 and the second steel substrate 14 from the faying interface 22 may not exceed about 90% of either of the first thickness 18 and the second thickness 20, respectively, so as to minimize and/or prevent weld surface cracks and extend an operating life of the first electrode (not shown) and the second electrode (not shown). More specifically, the penetration of the spot weld joint 16 may not exceed about 50% of either of the first thickness 18 and the second thickness 20 so as to optimally minimize weld cracks and maximize electrode operating life.

Figure 3:
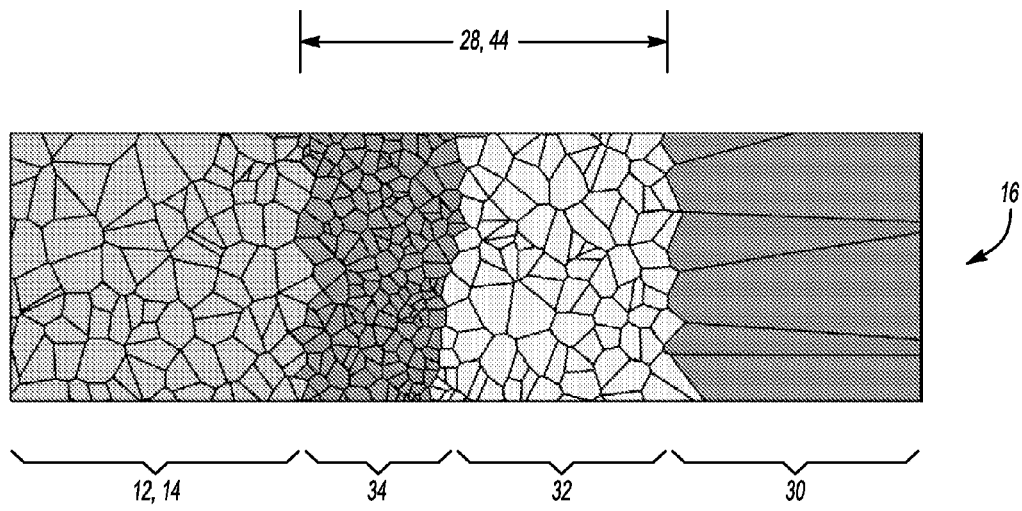
FIG. 3 is a magnified microstructural view of a portion of the first steel substrate and the second steel substrate of the composite manufactures of FIGS. 1 and 2.

Referring now to FIGS. 1-3, the first steel substrate 12 includes a heat-affected zone 28 adjacent the spot weld joint 16. As used herein, the terminology "heat-affected zone 28" refers to an area of the first steel substrate 12 having a microstructure altered by exposure to heat, e.g., heat generated during the aforementioned welding operation. That is, the heat-affected zone 28 may be formed in the first steel substrate 12 due to heat build-up and subsequent cooling of the first steel substrate 12. As shown in FIG. 3, the heat-affected zone 28 may include a region of the first steel substrate 12 between the spot weld joint 16 and a remainder of the first steel substrate 12 that is unaffected by heat. Stated differently, the heat-affected zone 28 may include a region of the first steel substrate 12 adjacent columnar grains 30 of the spot weld joint 16. In particular, the heat-affected zone 28 may include regions that upon heating form coarse grained austenite 32 and fine grained austenite 34, and may include steel partially-transformed to austenite (not shown) and/or annealed base steel (not shown).

Therefore, referring again to FIG. 1, the heat-affected zone 28 is adjacent the spot weld joint 16 within the first steel substrate 12 and has a boundary 40. The boundary 40 may define a transition within the first steel substrate 12 between fine grain steel (e.g., the fine grained austenite 34 of FIG. 3) and coarse grain steel (e.g., the coarse grained austenite 32 of FIG. 3). In addition, the boundary 40 may extend from the faying interface 22. For example, as shown in FIG. 1, the boundary 40 may abut and originate at the faying interface 22, and extend through the first steel substrate 12 to the outer second surface 26 of the first steel substrate 12. The intersection of the boundary 40 and the faying interface 22 (designated by points A and C in FIG. 1) may be referred to as a notch root, and may designate an initiation point for crack formation and propagation at the faying interface 22.

With continued reference to FIG. 1, the boundary 40 and the faying interface 22 define an angle 42 therebetween of greater than about 75°. Further, the angle 42 may be less than or equal to about 170° so that the boundary 40 is not parallel to the faying interface 22. For example, the angle 42 between the boundary 40 and the faying interface 22 may be from about 80° to about 120°. Without intending to be limited by theory, the angle 42 and resulting shape of the heat-affected zone 28 slows crack propagation within the spot weld joint 16 and therefore extends an operating life of the composite manufacture 10. That is, the angle 42 and resulting shape of the heat-affected zone 28 aligns the boundary 40 with a direction of minimized energy release and stress intensity within the spot weld joint 16 so as to minimize crack growth rates and maximize the fatigue life of the spot weld joint 16. Stated differently, the angle 42 deflects and propagates any cracks originating at the faying interface 22 along the boundary 40 of the heat-affected zone 28, and thereby minimizes crack growth rates of the composite manufacture 10. Thus, as set forth in more detail below, the composite manufacture 10 has excellent tensile strength and fatigue strength without requiring an increased first thickness 18 of the first steel substrate 12. As used herein, the terminology "tensile strength" refers to the maximum tensile stress, e.g., applied longitudinally in the direction of arrows 50 in FIG. 1, that the composite manufacture 10 can withstand without tearing apart. And, the terminology "fatigue strength" refers to the maximum stress that can be sustained by the composite manufacture 10 for a specific number of cycles without tearing apart, wherein the stress is completely reversed within each cycle.

As best shown in FIG. 2, it is contemplated that the spot weld joint 16 may have a shape that is different from the shape of the heat-affected zone 28. Alternatively, although not shown, the heat-affected zone 28 may be symmetrical with the spot weld joint 16 and have a generally hourglass shape.

Referring again to FIG. 1, in another variation, the second steel substrate 14 of the composite manufacture 10 has a second heat-affected zone 44 adjacent the spot weld joint 16. As used herein, the terminology "second heat-affected zone 44" refers to an area of the second steel substrate 14 having a microstructure altered by exposure to heat, e.g., by heat generated during the aforementioned welding operation. That is, the second heat-affected zone 44 may be formed in the second steel substrate 14 due to heat build-up and subsequent cooling of the second steel substrate 14. As shown in FIG. 3, the second heat-affected zone 44 may include a region of the second steel substrate 14 between the spot weld joint 16 and a remainder of the second steel substrate 14 that is unaffected by heat. Stated differently, the second heat-affected zone 44 may include a region of the second steel substrate 14 adjacent columnar grains 30 of the spot weld joint 16. More specifically, the second heat-affected zone 44 may include regions that upon heating form coarse grained austenite 32 and fine grained austenite 34, and may include steel partially-transformed to austenite (not shown) and/or annealed base steel (not shown).

Referring again to FIG. 1, the second heat-affected zone 44 is adjacent the spot weld joint 16 within the second steel substrate 14 and has a second boundary 46. The second boundary 46 may, for example, define a transition with the second steel substrate 14 between fine grain steel (e.g., the fine grained austenite 34 of FIG. 3) and coarse grain steel (e.g., the coarse grained austenite 32 of FIG. 3). Therefore, as shown in FIG. 1, each of the boundary 40 of the heat-affected zone 28 and the second boundary 46 of the second heat-affected zone 44 may define a transition with the first steel substrate 12 and the second steel substrate 14, respectively, between fine grain steel and coarse grain steel.

Further, the second boundary 46 may extend from the faying interface 22. For example, as shown in FIG. 1, the second boundary 46 may abut and originate at the faying interface 22, and extend through the second steel substrate 14 to the outer second surface 26 of the second steel substrate 14.

For example, the second boundary 46 may intersect the boundary 40 and faying interface 22 at points A and C in FIG. 1, i.e., at the notch root. Therefore, each of the boundary 40 of the heat-affected zone 28 and the second boundary 46 of the second heat-affected zone 44 may extend from the faying interface 22 of the composite manufacture 10.

Referring again to FIG. 1, the second boundary 46 and the faying interface 22 define a second angle 48 therebetween of greater than about 75°. And, the second angle 48 may be less than or equal to about 170° so that the second boundary 46 is not parallel to the faying interface 22. For example, the second angle 48 between the second boundary 46 and the faying interface 22 may be from about 80° to about 120°.

Therefore, as shown in FIG. 1, each of the angle 42 and the second angle 48 may be from about 80° to about 120°. Further, the second angle 48 may be the same or different than the angle 42, depending on the formation and diameter 24 (FIG. 2) of the spot weld joint 16. For example, the angle 42 may differ from the second angle 48 by less than about 10°. Therefore, as shown in FIG. 2, the spot weld joint 16 may have a shape that is also different from the shape of the second heat-affected zone 44. Alternatively, although not shown, the second heat-affected zone 44 may be symmetrical with the spot weld joint 16. Regardless, as shown in FIGS. 1 and 2, the heat-affected zone 28 and the second heat-affected zone 44 may combine to form a substantially hourglass shape.

Again without intending to be limited by theory, the second angle 48 and resulting shape of the second heat-affected zone 44 slows crack propagation within the spot weld joint 16 and therefore extends an operating life of the composite manufacture 10. That is, the second angle 48 and resulting shape of the heat-affected zone 44 aligns the second boundary 46 with a direction of minimized energy release and stress intensity within the spot weld joint 16 so as to minimize crack growth rates and maximize the fatigue life of the spot weld joint 16. Stated differently, the second angle 48 deflects and propagates any cracks originating at the faying interface 22 along the second boundary 46 of the second heat-affected zone 44. Thus, the composite manufacture 10 has excellent tensile strength and fatigue strength without requiring an increased second thickness 20 of the second steel substrate 14. The hourglass shape of the combined heat-affected zone 28 and second heat-affected zone 44 provides a crack propagation path that extends the fatigue life of the composite manufacture 10 as compared to composite manufactures having angles (not shown) at the notch root of less than or equal to about 75°.

In one specific variation described with reference to FIGS. 1 and 2, the composite manufacture 10 includes the first steel substrate 12 formed from advanced high strength steel, the second steel substrate 14 formed from advanced high strength steel and disposed in contact with the first steel substrate 12 to define the faying interface 22 therebetween, and the spot weld joint 16 penetrating the first steel substrate 12 and the second steel substrate 14 at the faying interface 22 to thereby join the second steel substrate 14 to the first steel substrate 12. The first steel substrate 12 defines the heat-affected zone 28 adjacent the spot weld joint 16 having the boundary 40 extending from the faying interface 22, wherein the boundary 40 and the faying interface 22 define the angle 42 therebetween of from about 80° to about 120°. Further, the second steel substrate 14 defines the second heat-affected zone 44 adjacent the spot weld joint 16 having the second boundary 46 extending from the faying interface 22, wherein the second boundary 46 and the faying interface 22 define the second angle 48 therebetween of from about 80° to about 120° so that the heat-affected zone 28 and the second heat-affected zone 44 combine to form a substantially hourglass shape.

Since the angle 42 and second angle 48, respectively, each align the boundary 40 and second boundary 46, respectively, along a direction of minimized energy release and stress intensity within the spot weld joint 16, the spot weld joint 16 has an excellent fatigue life, i.e., the number of cycles of stress that can be sustained by the composite manufacture 10 without tearing apart and/or unacceptable reduction in the tensile strength of the spot weld joint 16. For example, the spot weld joint 16 may have a fatigue life of up to about 100,000 cycles when subjected to a cyclic tensile shear load (represented by arrows 50 in FIG. 1) of about 1,200 lbs/cycle applied to each of the first steel substrate 12 and the second steel substrate 14, and a fatigue life of up to about 7,000,000 cycles when subjected to a cyclic tensile shear load (arrows 50) of about 600 lbs/cycle applied to each of the first steel substrate 12 and the second steel substrate 14, wherein a ratio (R) of a minimum applied tensile shear load to a maximum applied tensile shear load is about 0.1. Further, the spot weld joint 16 may have a fatigue life of up to about 700,000 cycles when subjected to a cyclic tensile shear load (arrows 50) of about 800 lbs/cycle applied to each of the first steel substrate 12 and the second steel substrate 14, wherein R is about 0.1. In this example, each of the first steel substrate 12 and the second steel substrate 14 may be formed from DP600 (dual phase) steel, and each of the first thickness 18 and the second thickness 20 may be about 1.6 mm.

Although not shown, the composite manufacture 10 may also include additional steel substrates, e.g., a third steel substrate sandwiched between the first steel substrate 12 and the second steel substrate 14 to define a plurality of faying interfaces 22. For this variation, each of the first steel substrate 12, the second steel substrate 14, and the third steel substrate (not shown) may be formed from the same steel. Further, each of the angle 42 and second angle 48 may be greater than about 75°, e.g., from about 80° to about 120°, so that crack propagation is minimized at the spot weld joint 16 to maximize the fatigue life of the composite manufacture 10.

The composite manufactures 10 exhibit excellent high cycle fatigue life. That is, the composite manufactures 10 are optimized to withstand a high number of cycles, e.g., up to millions of cycles, of tensile shear load applied to each of the first steel substrate 12 and the second steel substrate 14. More specifically, the angle 42 between the heat-affected zone 28 and the faying interface 22 slows crack propagation within the spot weld joint 16 and therefore extends an operating life of the composite manufactures 10. That is, the angle 42 and resulting shape of the heat-affected zone 28 align the boundary 40 with a direction of minimized energy release and stress intensity within the spot weld joint 16 to minimize crack growth rates and maximize the fatigue life of the spot weld joint 16. Therefore, the angle 42 deflects and propagates any cracks that originate at the faying interface 22 along the boundary 40 of the heat-affected zone 28. As such, the composite manufactures 10 are suitable for applications requiring excellent tensile strength, fatigue strength, and fatigue life without increased thickness 18, 20 of the first steel substrate 12 and the second steel substrate 14.

While the best modes for carrying out the disclosure have been described in detail, those familiar with the art to which this disclosure relates will recognize various alternative designs and embodiments for practicing the disclosure within the scope of the appended claims.

The invention claimed is:

1. A composite manufacture comprising:
a first steel substrate;
a second steel substrate disposed in contact with said first steel substrate to define a faying interface therebetween; and
a spot weld joint penetrating said first steel substrate and said second steel substrate at said faying interface to thereby join said second steel substrate to said first steel substrate;
wherein said first steel substrate has a heat-affected zone adjacent said spot weld joint having a boundary, wherein said boundary and said faying interface define an angle therebetween of greater than about 75°;
wherein said second steel substrate has a second heat-affected zone adjacent said spot weld joint having a second boundary, wherein said second boundary and said faying interface define a second angle therebetween of greater than about 75°; and
wherein said heat-affected zone and said second heat-affected zone combine to form a substantially hourglass shape.

2. The composite manufacture of claim 1, wherein said angle between said boundary and said faying interface is from about 80° to about 120°.

3. The composite manufacture of claim 2, wherein said boundary extends from said faying interface.

4. The composite manufacture of claim 1, wherein said boundary defines a transition within said first steel substrate between fine grain steel and coarse grain steel.

5. The composite manufacture of claim 1, wherein each of said first steel substrate and said second steel substrate has a second surface spaced opposite and apart from said faying interface that is not penetrated by said spot weld joint.

6. The composite manufacture of claim 5, wherein said spot weld joint has a shape that is different from a shape of said heat-affected zone.

7. The composite manufacture of claim 1, wherein said first steel substrate has a first thickness, and said second steel substrate has a second thickness that is different from said first thickness.

8. The composite manufacture of claim 1, wherein said first steel substrate has a first thickness and said second steel substrate has a second thickness that is greater than said first thickness, whereby a diameter of said spot weld joint at said faying interface is approximately equal to four times the square root of said first thickness of said first steel substrate.

9. The composite manufacture of claim 1, wherein each of said angle and said second angle is from about 80° to about 120°.

10. The composite manufacture of claim 9, wherein said angle differs from said second angle by less than about 10°.

11. The composite manufacture of claim 1, wherein each of said boundary and said second boundary extends from said faying interface.

12. The composite manufacture of claim 1, wherein each of said boundary and said second boundary defines a transition within said first steel substrate and said second steel substrate respectively between fine grain steel and coarse grain steel.

13. The composite manufacture of claim 1, wherein at least one of said first steel substrate and said second steel substrate is formed from steel.

14. A composite manufacture comprising:
a first steel substrate;
a second steel substrate disposed in contact with said first steel substrate to define a faying interface therebetween; and a spot weld joint penetrating said first steel substrate and said second steel substrate at said faying interface to thereby join said second steel substrate to said first steel substrate;

wherein said first steel substrate has a heat-affected zone adjacent said spot weld joint having a boundary extending from said faying interface, wherein said boundary and said faying interface define an angle therebetween of from about 80° to about 120°;

wherein said second steel substrate has a second heat-affected zone adjacent said spot weld joint having a second boundary extending from said faying interface, wherein said second boundary and said faying interface define a second angle therebetween of from about 80° to about 120° so that said heat-affected zone and said second heat-affected zone combine to form a substantially hourglass shape.

15. The composite manufacture of claim 14, wherein said spot weld joint has a fatigue life of up to about 100,000 cycles when subjected to a cyclic tensile shear load of about 1,200 lbs/cycle applied to each of said first steel substrate and said second steel substrate, and a fatigue life of up to about 7,000,000 cycles when subjected to a cyclic tensile shear load of about 600 lbs/cycle applied to each of said first steel substrate and said second steel substrate, wherein a ratio, R, of a minimum applied tensile shear load to a maximum applied tensile shear load is about 0.1.

* * * * *